United States Patent [19]
Lemaire et al.

[11] Patent Number: 6,147,341
[45] Date of Patent: Nov. 14, 2000

[54] TEMPERATURE COMPENSATING DEVICE FOR FIBER GRATINGS

[75] Inventors: Paul Joseph Lemaire; Lloyd Shepherd, both of Madison; John David Weld, Succasunna, all of N.J.

[73] Assignee: Lucent Technologies Inc., Murray Hill, N.J.

[21] Appl. No.: 09/023,425

[22] Filed: Feb. 13, 1998

[51] Int. Cl.$^7$ .................................................... G02B 6/34
[52] U.S. Cl. ...................................... 250/227.17; 385/37
[58] Field of Search ..................... 250/227.14–227.17; 385/13, 37, 76, 78, 94

[56] References Cited

U.S. PATENT DOCUMENTS

| | | | |
|---|---|---|---|
| 5,914,972 | 6/1999 | Siala et al. | 372/33 |
| 5,917,975 | 6/1999 | Bloom | 385/78 |
| 5,991,483 | 11/1999 | Engelberth | 385/37 |

*Primary Examiner*—Stephone B. Allen

[57] ABSTRACT

A compact temperature compensating device for an optical fiber grating includes an inner expansion member disposed concentrically within and in a substantially parallel relationship with an outer expansion member. The outer expansion member has a coefficient of thermal expansion greater than that of the inner expansion member. The device further includes a base member and a pivoting lever. The base member is fixedly attached to a distal end of the outer and inner expansion members and to a distal end of the fiber grating disposed concentrically within the inner expansion member. The lever is connected to a proximal end of the inner and outer expansion members and to a proximal end of the fiber grating through joints that are flexurally deformable so that, as the expansion members expand and contract differentially within an expected temperature range, the lever pivots about the inner expansion member and imparts a desired amount of axial strain in the fiber grating to maintain the grating wavelength substantially constant.

8 Claims, 2 Drawing Sheets

TEMPERATURE COMPENSATING DEVICE FOR FIBER GRATINGS

FIELD OF THE INVENTION

The present invention relates generally to optical fiber gratings and, more particularly, to a compact temperature-compensating package for optical fiber gratings.

BACKGROUND OF THE INVENTION

Optical fiber gratings are formed by exposing a photosensitive fiber such as, for example, boron-doped germanosilicate fiber to ultraviolet light so as to create permanent refractive-index perturbations at selective sections along the core of the fiber. A grating is a wavelength-selective reflector having a reflectance response curve with at least one well-defined peak. In other words, a fiber grating reflects light of a particular wavelength or a narrow band of wavelengths back along the original propagation direction, while permitting other wavelengths of light to propagate undisturbed. The reflected wavelength of light is often referred to as the grating wavelength.

Optical fiber gratings may be used in Wavelength Division Multiplexing optical systems for high-precision selective wavelength filtering so that signals propagating through an optical fiber can be separated, combined, and/or rerouted. They can also be used as feedback elements for a fiber optic laser or as external laser mirrors. For all such uses, it is essential that the grating wavelength remains constant over an expected temperature range of, for example, from –20° C. to 80° C. (i.e. $\Delta T=100°$ C.).

The grating wavelength $\lambda_g$ (or Bragg wavelength) is related to the effective guided mode index, n, of the optical fiber and the spacing of the grating sections, $\Lambda$ (also known as the grating period), in the following way:

$$\lambda_g = 2n\Lambda,$$

This equation shows that the effective guided mode index, n, and the grating period, $\Lambda$ are inversely proportional to each other. Therefore, in order to maintain $\lambda_g$ constant, an increase, for example, in the effective guided mode index, n, requires a proportionate decrease in the grating period, $\Lambda$.

For optical communication systems, it is essential that the grating wavelength remains constant over the expected temperature range. But this requirement is not so easily satisfied since the effective guided mode index of a fiber varies rather significantly over an expected temperature range of, for example, from –20° C. to 800° C. (i.e. $\Delta T=100°$ C.), primarily due to the temperature dependence of the fiber's refractive index. It has been reported that over this temperature range, the grating wavelength shift of an uncompensated 1550 nm grating can exceed 1 nm, which can be detrimental to an optical communication system.

Fortunately, it can be readily shown that in order to hold $\lambda_g$ constant over a temperature range, an increase in temperature must be accompanied by a corresponding decrease in strain in the fiber grating and vice versa. Stated in a different way, the change in strain ($\Delta\epsilon$) and change in temperature ($\Delta T$) in a fiber grating are inversely and linearly related to each other that is:

$$\Delta\epsilon/\Delta T = \text{constant} < 0$$

Accordingly, to compensate for or counteract an unwanted shift in grating wavelength, one could vary the grating period, $\Lambda$, through selective adjustment of strain in the fiber. Thus, for example, when the ambient temperature of the fiber grating rises, one may decrease the strain in the grating to maintain the same grating wavelength as that was set at the initial temperature condition. Similarly, when the ambient temperature of the fiber grating decreases, one needs to increase the strain in the grating so as to maintain the grating wavelength constant.

Heretofore, known temperature compensating devices for fiber gratings employ two expansion components mounted in series relative to the fiber grating, i.e., one end of the fiber grating is attached to the component disposed upstream of the fiber grating and the other end of the fiber grating is attached to the component disposed downstream of the fiber grating. The expansion components have different coefficients of thermal expansion. The fiber grating mounted between the two components is pre-strained so that an increase in the ambient temperature causes the two series-mounted components to lessen the pre-strain in the grating to compensate for the temperature dependence of the fiber grating and vice versa.

These known temperature compensating devices are relatively long in comparison with the length of the fiber grating. Accordingly, it is desired to provide a more compact temperature compensating device which offers significant space savings to the users.

SUMMARY OF THE INVENTION

The present invention is directed to a compact temperature compensating device for fiber gratings which is of substantially the same length as the fiber grating itself, and which enables the fiber grating to maintain a substantially constant grating wavelength over a temperature range.

The temperature compensating device for a pre-strained fiber grating of an optical fiber includes a first expansion member and a second expansion member disposed in a substantially parallel relationship with one another. The first expansion member is disposed outwardly from a longitudinal axis of the fiber grating and has a length at least as long as that of the fiber grating. The second expansion member is disposed radially outwardly from the first expansion member and also has a length at least as long as that of the fiber grating. Preferably, but not necessarily, the two expansion members are cylindrical and concentric or coaxial with each other and with the fiber grating.

The device further includes a base member affixing a distal end of the first expansion member and the second expansion member to a distal end of the fiber grating, and a lever flexibly connecting a proximal end of the first and second expansion members to a proximal end of the fiber grating. The coefficient of thermal expansion of the first expansion member is different from that of the second expansion member such that a change in ambient temperature or a change in the temperature of the device causes the first and the second expansion members to expand and contract differentially, thereby pivoting the lever to vary the axial strain in the fiber grating so as to maintain a grating wavelength of the fiber grating substantially constant throughout a desired temperature range.

In a particularly preferred embodiment, the fiber grating is pre-strained and the second expansion member has a greater coefficient of thermal expansion than that of the first expansion member so that an increase in temperature causes an outer end of the lever attached to the second expansion member to move away from the base member and an inner end of the lever attached to the optical fiber to move toward the base member, thereby reducing the pre-strain in the fiber grating. Similarly, a decrease in the temperature of the device causes the outer end of the lever attached to the second expansion member to move toward the base member and the inner end of the lever attached to the fiber to move away from the base member, thereby increasing the axial strain in the fiber grating.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
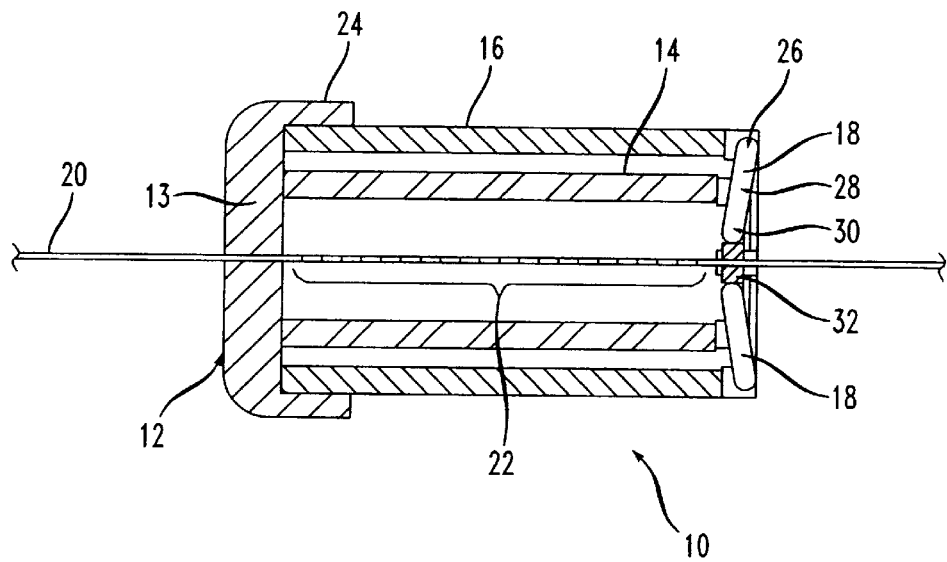
FIG. 1 depicts a cross-section of an embodiment of the temperature compensating device of the present invention.
Figure 2:
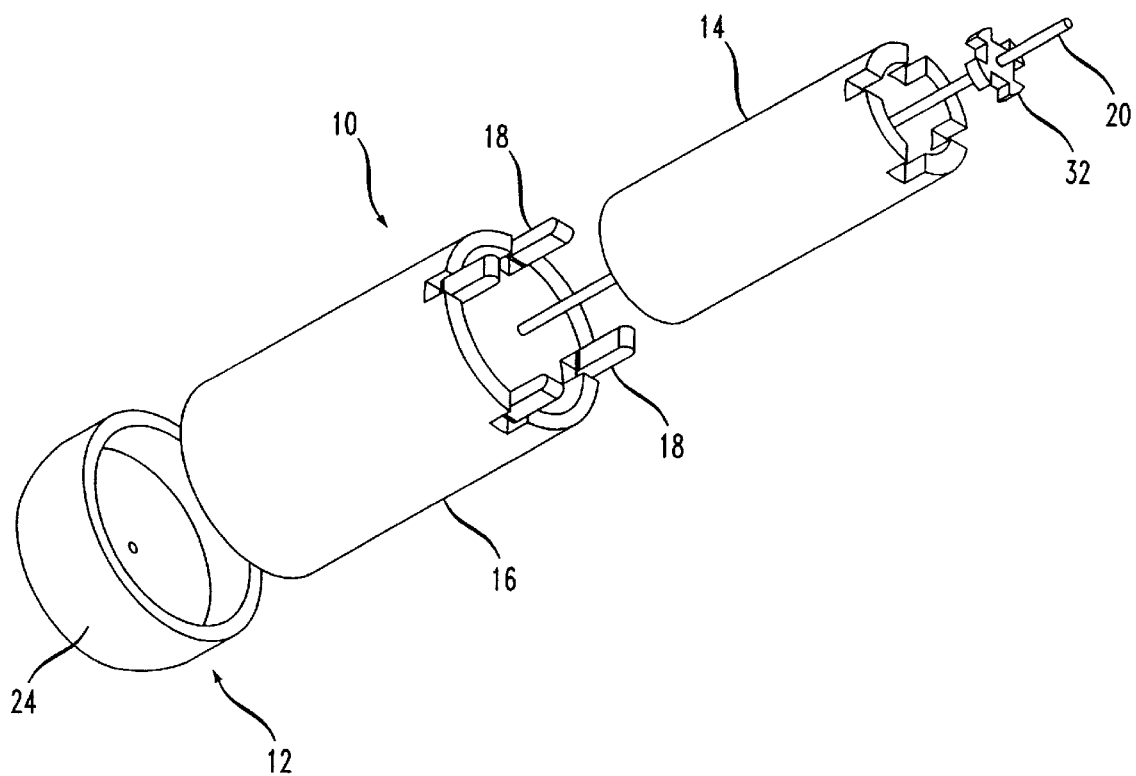
FIG. 2 is an exploded perspective view of the temperature compensating device of FIG. 1.

A preferred embodiment of the compact temperature compensating device 10 of the present invention is shown schematically and cross-sectionally in FIG. 1 and in an exploded perspective view in FIG. 2. As shown in these figures, the device 10 is preferably cylindrical in shape and includes a base member 12, an inner expansion member 14, an outer expansion member 16, and a plurality of pivoting levers 18. Disposed concentrically within the device is a portion of an optical fiber 20 having a grating 22 whose temperature dependence is to be compensated by the inventive device 10. The device 10 extends along a longitudinal axis of the fiber grating 22 and has a length which may be substantially the same as the length of the grating 22. As is demonstrated in FIGS. 1 and 2, the length of the device 10 is limited only by the thicknesses of the base member 12 and levers 18, and the length of the fiber portion containing grating 22. The grating 22 has grating sections that are selectively spaced from each other along the longitudinal axis of the optical fiber for reflecting one or more desired grating wavelengths. For the case where a single grating wavelength is desired, the grating sections are substantially equidistantly spaced from each other so as to provide a substantially constant grating period. The device 10 compensates for the shift in grating wavelength by automatically or dynamically adjusting the distance between the grating sections as will be described below.

Referring again to FIGS. 1 and 2, the base member 12 has a central opening for the optical fiber 20 to pass therethrough and is preferably rigidly connected to the optical fiber 20 through the use of, for example, solder, adhesive, epoxy, or other mechanical and/or metallurgical attachment techniques. The base member 12 preferably includes a circular disc 13 and a skirt 24 extending axially toward the pivoting levers 18.

Preferably, the inner expansion member 14 is disposed concentrically or coaxially with and radially outwardly from the longitudinal axis of the fiber grating 22 and is rigidly connected to the base member 12 at one end of expansion member 14. The inner expansion member 14 is dimensioned to have a length at least as long as that of the fiber grating 22 and is preferably of substantially the same length as that of the fiber grating 22.

Preferably, the outer expansion member 16 is disposed concentrically or coaxially with and radially outwardly from the circumferential surface of the inner expansion member 14 in a substantially parallel relationship with one another and with the fiber grating 22. One end of the outer expansion member 16 is preferably, rigidly secured to the base member 12.

Although the inner expansion member 14 and/or outer expansion member 16 shown in FIGS. 1 and 2 are cylindrical in shape, they may also be constructed of non-circular cross-sections such as, for example, rectangular or hexagonal cross-sections. It is contemplated that each of the members 14, 16 may include a longitudinal slit along its length for ease of assembly.

For reasons that will hereinafter be apparent, the outer expansion member 16 is preferably formed of a material having a coefficient of thermal expansion ("CTE") different from that of the inner expansion member 14. Preferably, the CTE of the outer expansion member 16 is higher than that of the inner expansion member 14. Thus, for example, the inner expansion member 14 may be formed of a material having a low CTE such as, for example, stainless steel (CTE≈18.54×10$^{-6}$ cm/cm.° C.), Invar® (CTE≈0 to 5×10$^{-6}$ cm/cm.° C.) or ceramic (CTE≈−10 to 10×10$^{-6}$ cm/cm.° C.), while the outer expansion member 16 may be fabricated of a material having a relatively high CTE such as, for example, aluminum with a CTE of about 22.68×10$^{-6}$ cm/cm.° C. In the preferred embodiment, the device 10 decreases the pre-strain in the fiber grating 22 as the temperature of the device 10 and the fiber grating 22 increases. In an alternative embodiment, the outer expansion member 16 may have a lower CTE than that of the inner expansion member 14 such that the device 10 increases the pre-strain in the fiber grating 22 as the temperature of the device 10 and the fiber grating 22 increases (or that the device 10 decreases the pre-strain in the fiber grating 22 as the temperature of the device 10 and the fiber grating 22 decreases) so as to exaggerate or amplify the change in grating wavelength of the fiber grating throughout a temperature range. The alternative embodiment would result in a grating with stronger than normal temperature dependence or increased temperature response, which is useful in a device such as, for example, a temperature sensor.

In any event, one advantage of pre-straining the fiber grating 22 is that it serves to fine-tune the grating wavelength at an initial or reference temperature state such as, for example, room temperature. Another advantage of pre-straining is that it provides the necessary tensile strain in the grating 22 so that when the device 10 is at an extreme of an expected temperature range the device 10 does not compress the fiber grating 22. Compression of the fiber grating 22 is not desirable as the compressive forces exerted by the device 10 tend to buckle the grating 22 and therefore fall to impart the desired axial strain to the grating 22.

It is contemplated that the fiber grating 22 may be pre-strained to a desired length using any known means prior to its attachment or assembly with the temperature compensating device 10 at an initial or reference temperature. In this embodiment, the fiber grating 22 has a fixed or non-adjustable amount of pre-strain after assembly. Alternatively, the temperature compensating device 10 may include an adjustment mechanism constructed with any known means to selectively impart a desired amount of strain in the fiber grating 22. Such an adjustment mechanism allows a user to vary the amount of pre-strain in the fiber grating 22 at any reference temperature and at any time, after the fiber grating 22 has been attached to the temperature compensating device 10.

As illustrated in FIGS. 1 and 2, the pivoting levers 18 are flexibly connected to the outer expansion member 16, the inner expansion member 14, and the optical fiber 20 (through fiber mount 32) such that a change in temperature in the device 10 causes the inner and outer expansion members 14, 16 to expand and contract differentially thereby pivoting the levers 18 to vary the axial strain in the fiber grating 22 so as to maintain a grating wavelength of the fiber grating 22 substantially constant throughout a desired temperature range. Referring more particularly to FIG. 1, each of the levers 18 is connected to the outer expansion member 16 through a flexure joint 26 at or proximate an outer end of lever 18, to the inner expansion member 14 through a flexure joint 28 at or proximate an intermediate point of lever 18, and to a fiber mount 32 through a flexure joint 30 at or proximate an inner end of lever 18. As defined herein, the term "flexure joint" refers to a flexible or elastically deformable joint which allows angular or pivot-like movement through, for example, elastic or plastic flexural deformation.

With respect to the joint attaching the fiber mount 32 to the fiber 20, it is preferred that the joint be made sufficiently rigid so that the desired amount of axial strain may be imparted by the lever 18 to the fiber grating 22 through the joint.

Figure 3:
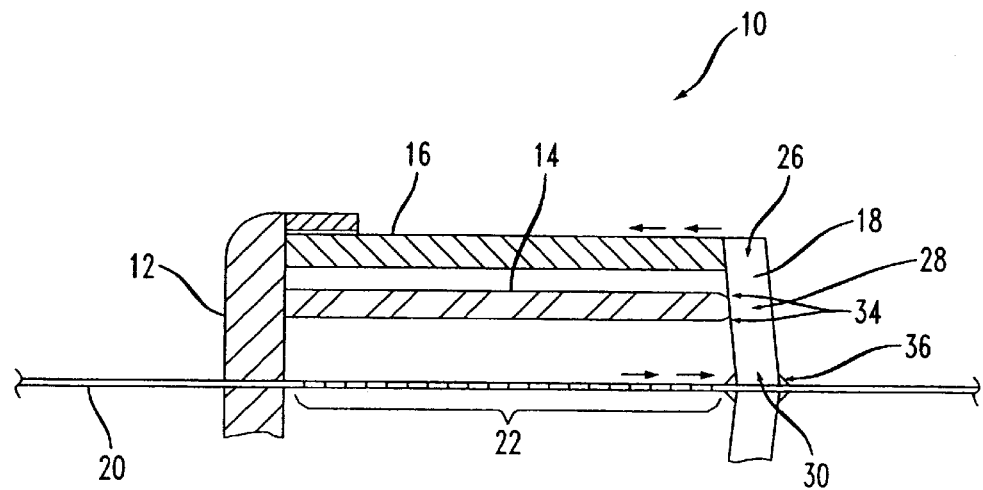
FIG. 3 is a cross-sectional view of another embodiment of the temperature compensating device of the present invention.

Since the adjustment in strain in a fiber grating such as, for example, a 1550 nm grating, is typically small (e.g. for a grating that is 40 mm long at its reference temperature, the adjustment in strain during a temperature change of 100° C. will be only about 38 microns), the flexure joints 26, 28, 30 are most desirably implemented as, but not limited to, welded or fused joints which are flexurally deformable. Depicted in FIG. 3 is an embodiment showing a flexure joint 28, which is a fused joint having an appropriately shaped V-notch 34 defined circumferentially about the joint 28. The V-notch 34, by way of its geometry, increases or enhances the angular flexibility of joint 28 by amplifying or concentrating the stress at joint 28 so as to increase the amount of elastic deformation or strain occurring at the joint for a given force. As shown, the pivoting lever 18 is attached to fiber 20 through, for example, solder joint 36 and to outer expansion member 16 through a fused joint 26 which can be made more flexible by incorporating an appropriately shaped V-notch similar to that of fused joint 28.

To ensure that the desired deflection is transmitted to the grating 22 through differential expansion or contraction of expansion members 14, 16, the cross-sectional geometry of the pivoting lever 18 should be appropriately sized for substantially practical rigidity. Otherwise, lever 18 might merely bend or flex without transmitting the desired deflection to grating 22. FIG. 3 shows how the device 10 increases the axial strain in the fiber grating 22 through the pivoting action of lever 18 caused by, for example, the contraction of outer expansion member 16.

Preferably, the plurality of pivoting levers 18 are two or more in number and are substantially symmetrically disposed about the longitudinal axis of the fiber grating 22 so that the resultant force transmitted by the levers 18 is directed substantially along the longitudinal axis of fiber grating 22. As shown and presently preferred, four levers 18 have been found to yield good results. It is contemplated that the pivoting levers 18 may, instead of being constructed as a plurality of beam-like members, be configured as an annular member or be of other suitable geometries.

It will be appreciated by the ordinary artisan that the inventive device 10 achieves, through the mechanical advantage of the levers 18, the requisite change in strain in the grating 22 with shorter expansion members relative to prior art devices.

A preferred embodiment of the inventive temperature compensating device 10 having an outer expansion member 16 with a higher CTE than that of the inner expansion member 14 operates as follows. At an initial or reference temperature, a user adjusts and presets, through an adjustment mechanism (either on or off the device), a desired amount of pre-strain in the grating 22 as discussed above. When the temperature of the device 10 rises above the initial temperature, the length of the outer expansion member 16 increases more than that of the inner expansion member 14, thereby causing the lever 18 to pivot about the flexure joint 28 and move flexure joint 30 and fiber mount 32 axially toward the base member 12. As a result, the pre-strain in the grating 22 is automatically or dynamically decreased to compensate for the increase in the effective guided mode index of the grating 22 so as to maintain a substantially constant grating wavelength. Conversely, when the temperature of the device 10 falls below the initial or reference temperature, the outer expansion member 16 contracts, thereby causing the lever 18 to pivot about flexure joint 28 and move flexure joint 30 and fiber mount 32 axially away from the base member 12. Accordingly, the strain in the grating 22 is increased to compensate for the decrease in the effective guided mode index of the fiber so as to maintain a substantially constant grating wavelength.

Figure 4A:
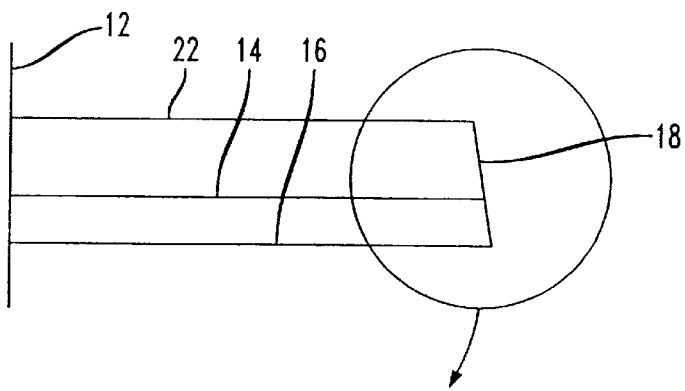
FIG. 4 is a graphical representation of a bottom-half of the cross-section of the device of FIG. 1 showing the geometrical relationships of the expansion members and the optical fiber in a temperature state where the strain in the fiber grating is adjusted by the device.
Figure 4B:
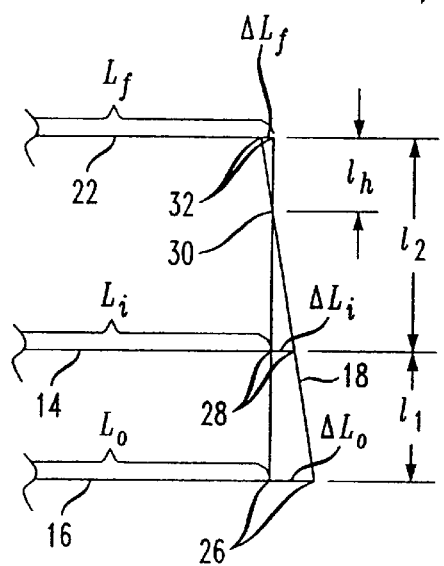

FIG. 4 is a graphical representation of the bottom-half portion of the cross section of the embodiment of FIG. 1 in an elevated temperature state where the outer expansion member 16 having a greater CTE has expanded and the pre-strain in the fiber grating 22 is decreased through the pivoting action of lever 18. As depicted, $l_h$ is the distance between flexure joint 30 of the pivoting lever 18 and the longitudinal axis of grating 22, $l_1$ is the distance between the outer expansion member 16 and the inner expansion member 14, $l_2$ is the distance between the longitudinal axis of grating 22 and the inner expansion member 14, $L_f$ is the initial or original length of the fiber 20 containing the grating 22 disposed within the confines of the device 10, $L_i$ is the initial length of the inner expansion member 14, $L_o$ is the initial length of the outer expansion member 16, $\Delta L_f$ is the change in strain in the fiber 20 contained in the device 10 (over a temperature change, $\Delta T$), $\Delta L_i$ is the change in length of the inner expansion member 14 (over $\Delta T$), and $\Delta L_o$ is the change in length of the outer expansion member 16 (over $\Delta T$).

Based on the geometric relationships, and in particular, the congruent triangles shown in FIG. 4, the requisite ratio of $l_1$ and $l_2$, can be calculated using the following equation, Equation (1):

$$\frac{(l_1 + l_2)L_i \alpha_i - l_2 L_o \alpha_o}{l_1 L_f} = \frac{p_e \alpha_f + \zeta}{1 - p_e}$$

where $\alpha_i$ is the CTE of the inner expansion member 14, $\alpha_o$ is the CTE of the outer expansion member 16, $\alpha_f$ is the CTE of the fiber 20, $p_e$ is the photoelastic constant of the fiber 20, and $\zeta$ is the thermooptic coefficient of the fiber 20. Noting that at the initial temperature state, $L_f = L_o = L_i$, the above equation can be further simplified to the following form:

$$\frac{l_2}{l_1} = \frac{a \text{ constant} - \alpha_i}{\alpha_i - \alpha_o}$$

To demonstrate, by way of a non-limiting example, the compactness of the inventive temperature compensating device 10, we consider a fiber grating having a length $L_f$=1.0 cm confined in the device, $p_e$=0.22, $\zeta$=8.31×10$^{-6}$ cm/cm.° C., and $\alpha_f$=0.55×10$^{-6}$ cm/cm.° C., an outer expansion member made from aluminum (e.g. grade 2024) having a length $L_o$=1.0 cm and $\alpha_o$=22.68×10$^{-6}$ cm/cm.° C., and an inner expansion member made from stainless steel (annealed) having a length $L_i$=1.0 cm and $\alpha_i$=18.54×10$^{-6}$ cm/cm.° C. Inserting these values into Equation (1):

$$\frac{18.54(l_1+l_2) - 22.68 l_2}{l_1} = 10.81$$

and after reducing, the ratio of the lever pivot lengths $l_1$ and $l_2$ is as follows:

$$\frac{l_1}{l_2} = 0.536$$

Choosing a reasonable value for $l_1$ as 0.1 cm, $l_2$ is then 0.187 cm. For a tubular design, the overall diameter of the device is therefore less than 0.6 cm.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A temperature compensating device for a pre-strained fiber grating of an optical fiber, said temperature compensating device extending along a longitudinal axis of the fiber grating, comprising:

a first expansion member formed of a material having a first coefficient of thermal expansion and disposed radially outwardly from the longitudinal axis of the fiber grating and having a length at least as long as the fiber grating, a second expansion member formed of a material having a second coefficient of thermal expansion and disposed outwardly from said first expansion member and having a length at least as long as the fiber grating, said second coefficient of thermal expansion being different from said first coefficient of thermal expansion;

a base member affixing a distal end of said second expansion member and said first expansion member to a distal end of the fiber grating; and a lever having an inner end, an intermediate portion, and an outer end, said lever being flexibly connected to a proximal end of said second expansion member proximate the outer end of said lever and to a proximal end of said first expansion member proximate the intermediate portion of said lever and to a proximal end of the fiber grating proximate the inner end of said lever such that a change in temperature in said device causes said first and second expansion members to expand and contract differentially thereby pivoting said lever to vary the axial strain in the fiber grating so as to maintain a grating wavelength of the fiber grating substantially constant throughout a desired temperature range.

2. The temperature compensating device of claim 1, wherein said second coefficient of thermal expansion is greater than said first coefficient of thermal expansion.

3. The temperature compensating device of claim 1, wherein the intermediate portion of said lever is fused with the proximal end of said first expansion members through a flexure joint such that said lever may pivot about said first expansion member as said second expansion member expands and contracts.

4. The temperature compensating device of claim 1, wherein said first and second expansion members and the fiber grating are of substantially equal lengths.

5. The temperature compensating device of claim 1, wherein said first and second expansion members are substantially cylindrical.

6. The temperature compensating device of claim 5, wherein said first and second expansion members are coaxial and in a substantially parallel relationship with one another and with said pre-strained fiber grating.

7. The temperature compensating device of claim 6, wherein said second expansion member is at a distance $l_1$ from a circumferential surface of said first expansion member, and said first expansion member is at a distance $l_2$ from the longitudinal axis of said fiber grating, and said $l_1$ and $l_2$ are governed by the following relationship:

$$\frac{(l_1+l_2)L_i\alpha_i - l_2 L_o \alpha_o}{l_1 L_f} = \frac{p_e \alpha_f + \zeta}{1 - p_e}$$

where $\alpha_i$ is the coefficient of thermal expansion of the first expansion member, $\alpha_o$ is the coefficient of thermal expansion of said second expansion member, $\alpha_f$ is the coefficient of thermal expansion of the fiber, $p_e$ is the photoelastic constant of the fiber, and $\zeta$ is the thermooptic coefficient of the fiber.

8. A temperature sensing device, comprising:

a pre-strained fiber grating of an optical fiber, said fiber grating having a longitudinal axis;

a first expansion member formed of a material having a first coefficient of thermal expansion and disposed radially outwardly from the longitudinal axis of said fiber grating and having a length at least as long as said fiber grating, a second expansion member formed of a material having a second coefficient of thermal expansion and disposed outwardly from said first expansion member and having a length at least as long as said fiber grating, said first coefficient of thermal expansion being greater than said second coefficient of thermal expansion;

a base member affixing a distal end of said second expansion member and said first expansion member to a distal end of said fiber grating; and a lever pivotally connected to a proximal end of said another expansion member and to another end of said first expansion member and to a proximal end of the fiber grating such that a change in temperature in said device causes said first and second expansion members to expand and contract differentially thereby pivoting the lever to vary the axial strain in said fiber grating so as to exaggerate a change in a grating wavelength of the fiber grating throughout a temperature range.

* * * * *